United States Patent

[11] 3,572,764

| [72] | Inventor | Richard J. Rubin |
| | | 39 Dolphin Road, Newton, Mass. 02159 |
| [21] | Appl. No. | 784,131 |
| [22] | Filed | Dec. 16, 1968 |
| [45] | Patented | Mar. 30, 1971 |

[54] RETRACTABLE HITCHING DEVICE
10 Claims, 7 Drawing Figs.

[52] U.S. Cl. .................................................. 280/491, 280/47.37
[51] Int. Cl. .................................................. B60d 1/00
[50] Field of Search .......................................... 280/491, 408, 491.1, 415, 47.37

[56] References Cited
UNITED STATES PATENTS

| 1,582,045 | 4/1926 | Howe ............................ | 280/47.37 |
| 2,195,636 | 4/1940 | Ulrich .......................... | 280/408 |
| 2,896,969 | 7/1959 | Carty ........................... | 280/491(.1) |
| 3,287,026 | 11/1966 | Craven ........................ | 280/415(.1) |

FOREIGN PATENTS

| 375,840 | 5/1923 | Germany ...................... | 491(.1)/ |

*Primary Examiner*—Leo Friaglia
*Attorney*—Dike, Thompson & Bronstein

ABSTRACT: A retractable hitching device including a member having at least two pins extending therefrom and a pair of rails over which the two pins slide and in which there are provided holes for receiving the pins.

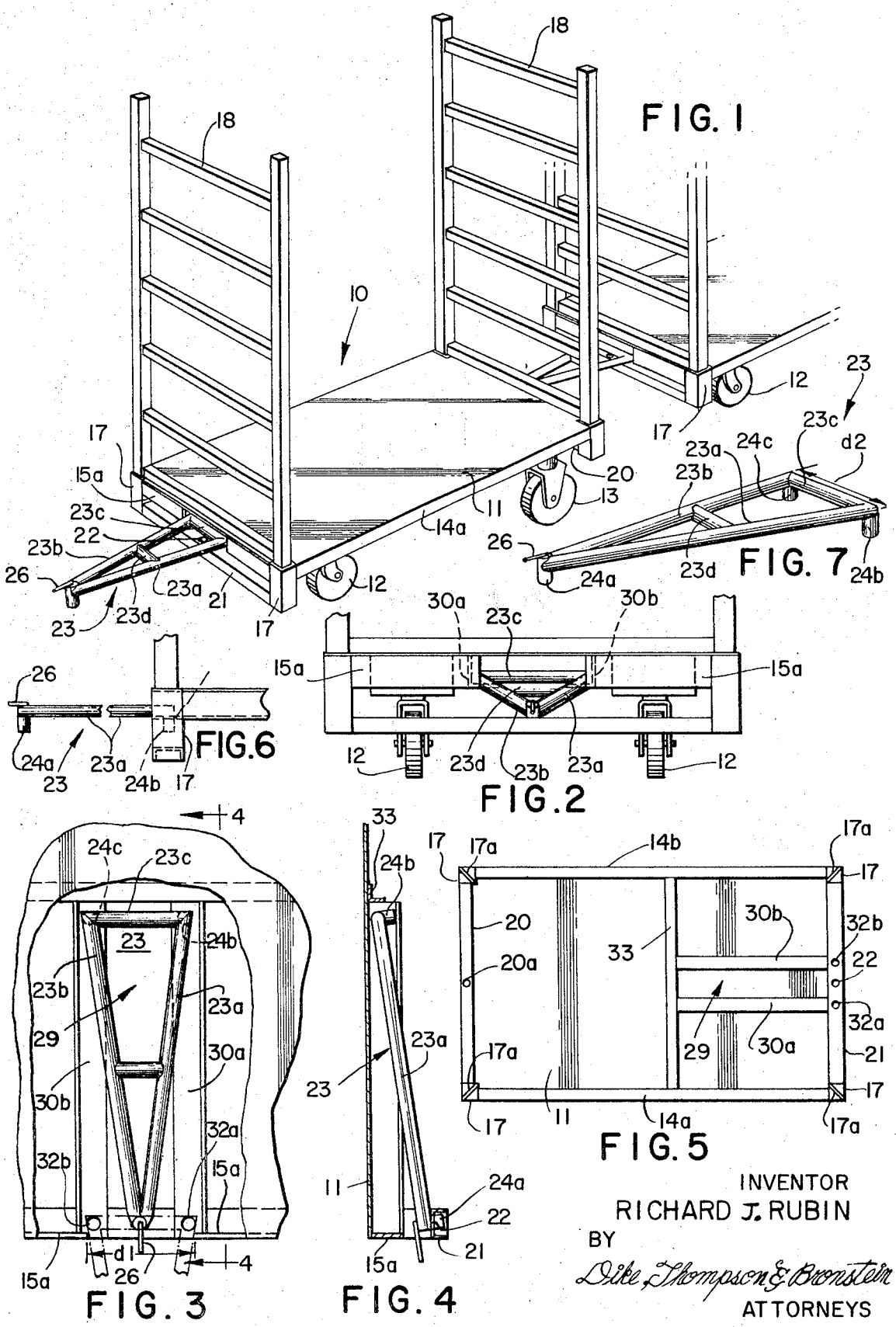

RETRACTABLE HITCHING DEVICE

BACKGROUND OF THE INVENTION

This invention relates generally to carts, wagons or handtrucks and is directed more particularly to a new and improved retractable hitching device construction for use therewith. Carts or wagons of the type shown in the drawings herein are generally used in commercial establishments such as warehouses, manufacturing plants, and supermarkets for transporting goods between different locations in the warehouse, supermarket or in the plant. Generally these wagons or carts are coupled together such as shown in the drawings and are pulled by a small four wheeled motorized vehicle.

The most common type of hitch in use is of the type found on children's wagons which is pivotally connected to the cart or wagon.

The prior art hitches such as noted above for connecting one cart to another and to a vehicle are generally not retractable and accordingly when the carts are not in use the fixed in place hitch (not retractable) is often a safety hazard.

In addition the prior art type of hitch constructions are also expensive to manufacture and therefore a new and improved hitch arrangement was needed.

Accordingly, it is an object of this invention to provide a new and improved retractable hitch. Another object of the invention is to provide a new and improved retractable hitch which when pulled out for use will be locked in place.

A further object of this invention is to provide a new and improved retractable hitch construction wherein the hitch is retractable into a wagon or cart.

Further objects and advantages of the invention will be apparent from the following description taken in conjunction with the accompanying drawings. It will be understood that changes may be made in the details of the construction and arrangement of parts shown and described, as the preferred embodiments of the invention have been presented by way of illustration only,

BRIEF DESCRIPTION OF THE DRAWINGS

FIG. 1 is a perspective view of a pair of carts or wagons including the retractable hitch according to the invention;

FIG. 2 is an enlarged front view, partially broken away, of a cart or wagon shown in FIG. 1 showing the retractable hitch according to the invention;

FIG. 3 is an enlarged top plan view of the retractable hitch according to the invention with parts of the wagon broken away and showing the movable portion of the hitch in the extended and retracted positions;

FIG. 4 is a sectional view taken along line 4—4 of FIG. 3;

FIG. 5 is a bottom view with certain parts removed showing the wagon of FIG. 1;

FIG. 6 is a side view of a portion of the hitch construction showing the movable hitch portion in an extended position; and FIG. 7 is a perspective view of the A frame movable portion of the hitch according to the invention,

DESCRIPTION OF THE PREFERRED EMBODIMENTS

Referring now more particularly to the drawings wherein similar reference characters designate corresponding parts throughout, the invention relates particularly to a retractable hitch adaptable for use with a cart or wagon. One of the carts or wagons is generally shown at 10 and is shown having floor at 11 for supporting material such as cartons or the like and having a pair of front wheels pivotally mounted and shown at 12 and a pair of rear wheels also pivotally mounted shown at 13. The floor 11 is supported by side structural members 14a and 14b and by front and rear structural members, the front being shown at 15a. In addition there are provided hollow end structural members 17 coupled to the side structural members and the front and rear structural members and which are partially sealed at the bottom by bars 17a. Front and rear closure members 18 are positioned and slidably supported by the end member 17 as shown in a conventional manner. At the rear end of the wagon there is provided a crossbar structural member 20 coupled to the end members 17. A hole 20a (see FIG. 5) may be formed in this structural member such that the hitch of one wagon may be pivotally coupled to a wagon in front of it. At the front of the wagon there is provided a further structural member 21 coupled between the end pieces 17 and which has a hole shown at 22 formed therein. The retractable hitch member according to this invention is shown at 23 and is preferably of a triangular shape as for example the shape of an A frame having two elongated side members shown at 23a, 23b and a rear cross piece shown at 23c and a center cross piece shown at 23d. The parts mentioned above may be conventionally welded together to form the A frame hitch member 23. It should be understood that other equivalent shaped retractable hitch members may be employed so long as they perform substantially the same function and operate in substantially the same function and operate in substantially the same manner.

At each end of the A frame member 23 there are provided pins shown at 24a, 24b and 24c all of which extend in the same direction. In addition there is provided a member 26 attached to the front most pin 24a so that the A frame member 23 may be lifted or raised and moved to a desired position. As shown, the A frame member 23 is preferably welded together but it is to be understood that if desired it could be cast as a single assemblage or constructed in any other suitable manner.

Reference now should be had more particularly to FIGS. 2 through 7 which shown in more detail the construction of a guide or track assembly 29 for the retractable A frame member 23. The guide assembly comprises rails shown at 30a and 30b preferably substantially parallel to each other and over which the pins 24b and 24c slide. Both rails 30a and 30b are provided with holes or receptacles shown at 32a and 32b at the front end thereof for receiving the pins 24b and 24c (shown dotted in FIGS. 3 and 6). The guide rails 30a and 30b are essentially L-shaped members which are welded to the underside of the floor 11 and also welded in front to the member 15a. In addition the rails 30a and 30b are welded at their rear ends to a stop member shown at 33 (see FIGS. 4 and 5). The stop member 33 is itself welded to the side members 14a and 14b as well as the underside of the floor 11. Referring now more particularly to FIGS. 2 and 3 the member 15a is shown cutout such that the A frame member 23 may extend outwardly from under the cart 10. The opening formed in the member 15a is preferably of a dimension such that the A frame member 23 rear portion 23c is prevented from extending outwardly from the front of the cart. In order to accomplish this, the cutout or opening formed in member 15a is of a width $d_1$ (see FIG. 3) which is less than the length of $d_2$ of the rear portion 23c (see FIG. 7). The spacing between the two rails or tracks 30a and 30b is such that the A frame member 23 as shown may be moved and retracted such that the pin 24a can be positioned and locked within the hole 22 formed in the member 21, the member 21 being preferably positioned below the plane of the rails 30a and 30b. As may be seen in FIG. 4, the underside of the floor 11 acts as an upper stop to limit the movement of the A frame member 23. Referring now again to FIG. 6, there is shown member 23 in its extended rather than its retracted position. In this position the pins 24b and 24c will be positioned in the holes at 32a and 32b such that the A frame member 23 will be locked in place. The operation of the device will be apparent to those skilled in the art from the foregoing description. The entire cart or wagon 10 and the parts described herein may be welded together or be constructed in any other convenient manner. While one desirable embodiment of the invention has been shown in the drawings it is to be understood that this disclosure is for the purpose of illustration only and that various changes in shape, proportion and arrangement of parts as well as the substitution of equivalent elements for those herein shown and described, may be made without departing from the spirit and scope of the invention as set forth in the appended claims.

I claim:

1. In a wagon, support means coupled to the wagon frame, a pair of rails spaced apart from each other and secured to said support means within the confines of the wagon, a retractable hitch frame member slidable over said rails and extending between said rails, said rails being substantially parallel to each other and each having a hole formed therein, said retractable hitch frame member having three pins, two of said pins being slidably positionable on said rails such that they may be locked in place in said holes when the retractable hitch frame member is in an operative position, a stationary member coupled to said support means and having a hole formed therein, said stationary member positioned such that the third pin may be positioned in the hole formed therein when said two pins are positioned on said rails and the retractable hitch frame member is substantially retracted within the confines of the wagon.

2. A device according to claim 1 in which there is provided stop means for preventing at least a portion of said retractable hitch frame member from falling off said rails.

3. In a wagon, a retractable hitching device comprising a pair of rails spaced apart from each other and coupled to the wagon, each rail having a hole formed therein at the front end thereof, a movable member including a hitch and having a plurality of pins extending therefrom in the same direction, one of said pins slidable on one of said rails and another of said pins slidable on the other of said rails, said pins slidable on said rails positioned on said movable member such that they may be received in the holes formed in said rails when said movable member is moved to its operative towing position, a fixed member coupled to said wagon and having a hole formed therein, said fixed member positioned to receive another one of said pins when said movable member is moved to its retracted position wherein said other two above-mentioned pins are positioned on said rails but out of said holes formed in said rails.

4. A device according to claim 3 in which there is provided a stop member at the front ends of said rails for preventing a portion of said movable member from extending past the front ends of said rails.

5. A device according to claim 4 in which the movable member is substantially triangular shape and in which the pins are positioned at the intersections of the parts forming the movable member.

6. A device according to claim 5 in which the fixed member is positioned in a plane below the plane of the rails.

7. A device according to claim 6 in which a stop member is provided at the rear end of the rails to limit the rearward movement of said movable member.

8. A device according to claim 7 in which a member is positioned over the top of said rails to limit the upward movement of said movable member.

9. In a wagon, support means coupled to the wagon frame, a pair of rails spaced apart from each other and secured to said support means within the confines of the wagon, a retractable hitch frame slidable over said rails and extending between said rails, said rails being substantially parallel to each other and each having a hole formed therein, said retractable hitch frame having two pins and a coupling means, said two pins being slidably positionable on said rails such that they may be locked in place in said holes when the retractable hitch frame is in an operative position, a stationary member coupled to said support means and having a coupling receiving means, said stationary member positioned such that the coupling means may be coupled to said coupling receiving means when said two pins are positioned on the rails and the retractable hitch frame member is substantially retracted within the confines of the wagon.

10. A device according to claim 9 in which the coupling means and the coupling receiving means comprises a pin supported by one of said means which is adapted to be received by a hole formed in the other of said means.